May 7, 1940.  A. E. VAN WIRT  2,199,928
ROTARY EXTRACTOR
Filed Feb. 9, 1938   2 Sheets-Sheet 1
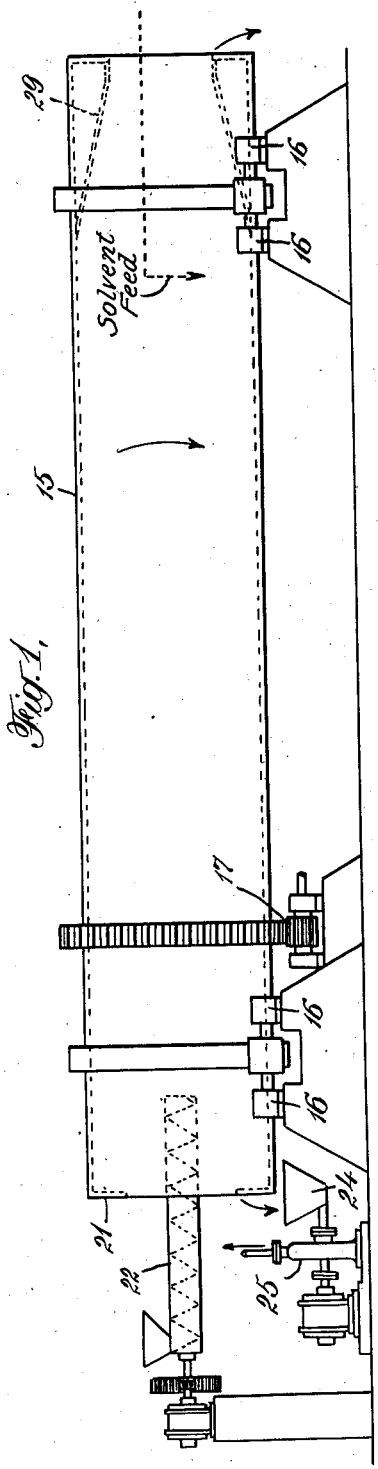
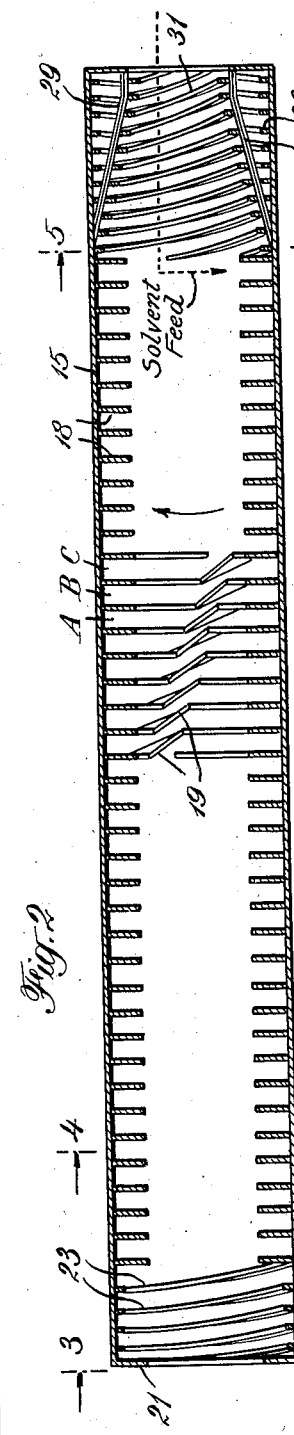
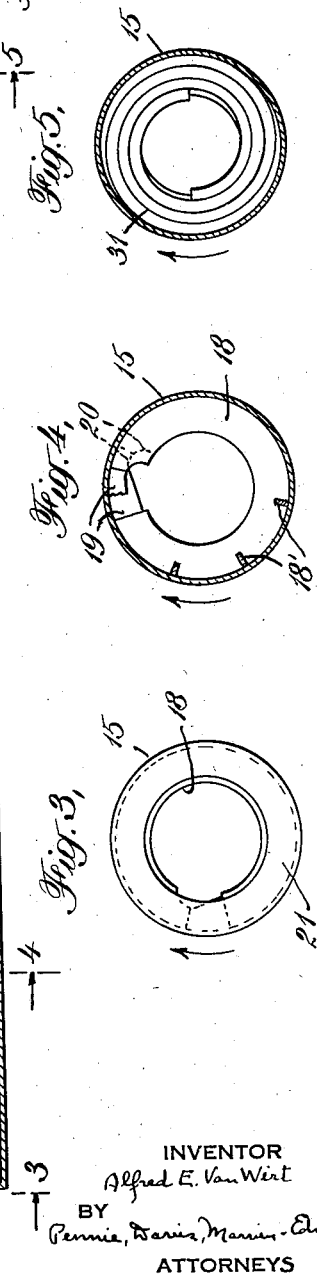
INVENTOR
Alfred E. Van Wirt
BY
Pennie, Davies, Marvin-Edmonds
ATTORNEYS

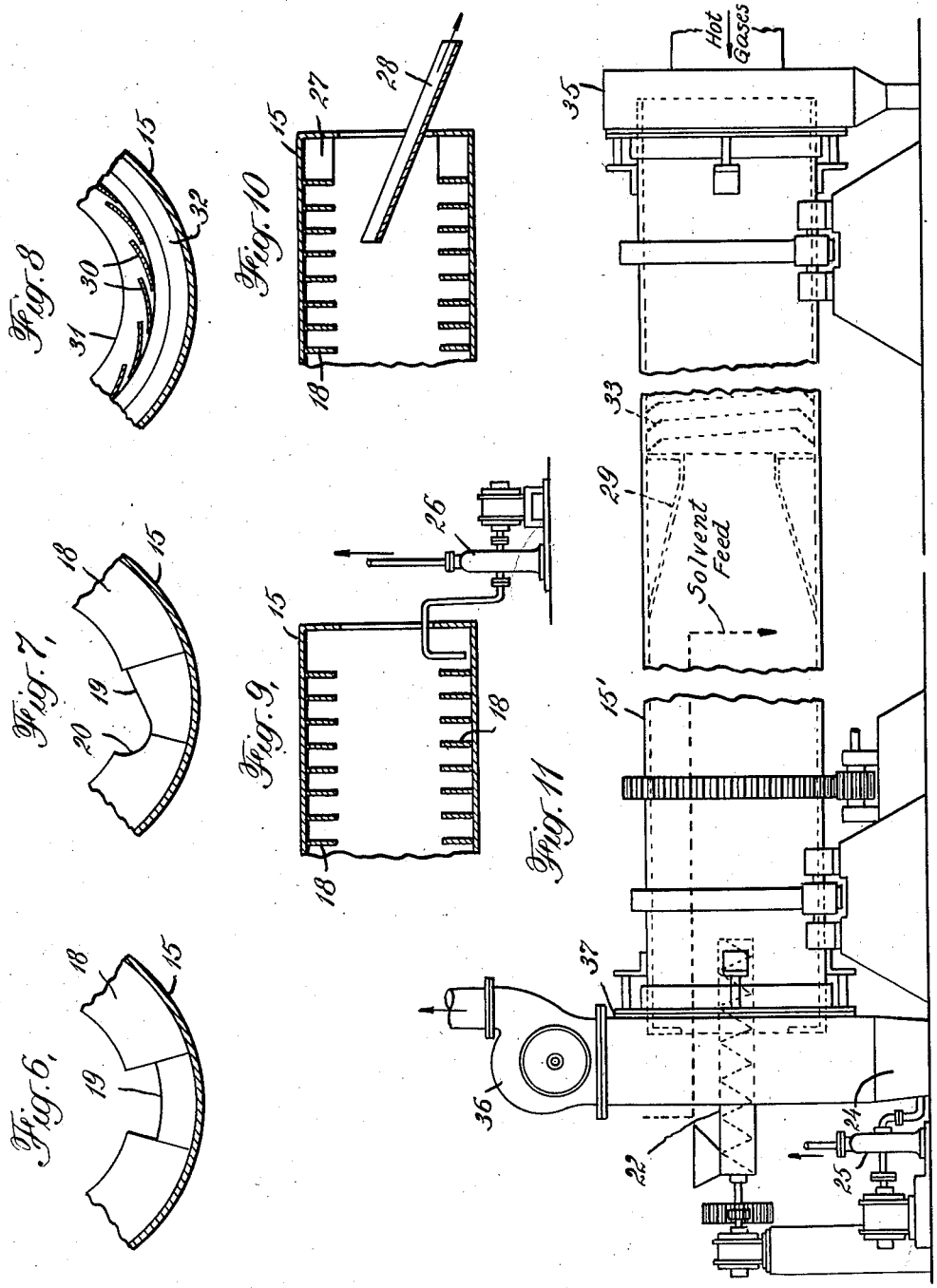

Patented May 7, 1940

2,199,928

UNITED STATES PATENT OFFICE 2,199,928

ROTARY EXTRACTOR

Alfred E. Van Wirt, Glens Falls, N. Y., assignor to Imperial Paper and Color Corporation, Glens Falls, N. Y., a corporation of New York Application February 9, 1938, Serial No. 189,635

18 Claims. (Cl. 23—269)

This invention relates to extracting or leaching soluble material from a mixture of soluble and insoluble materials, and has for its object the provision of an improved method of and apparatus for extracting soluble material from such a mixture. More particularly the invention aims to provide an improved apparatus of the rotary type for continuously extracting the soluble material from the mixture containing the same in which the mixture and liquid solvent for the soluble material move countercurrently through the apparatus in consequence of its rotation.

The invention is of particular advantage wherever the amount of solvent used should be small in relation to the amount of insoluble material present. A typical example of such an application of the invention is in the extraction of soluble alkali chromates from the calcined product obtained by roasting chromite ore with an alkali agent, such as soda ash. The alkali chromate is dissolved from the calcined product by water, and it is desirable that the soluble material be very completely extracted in as small a volume of water as possible, so as to minimize subsequent evaporation and other process operations. In this as well as in other applications of the invention, it is desirable that the extracting operation be made continuous, thus permitting it to be operatively coupled with the calcining operation. To this end, the invention further contemplates the combination with the extractor of the invention of a drying chamber for the residual insoluble material.

Briefly, the method of the invention comprises countercurrently passing a liquid solvent for the soluble material and a mixture of the soluble and insoluble materials through an operatively connected series of rotating compartments in each of which agitation of the solvent and materials is effected in consequence of the rotation, and effecting the countercurrent movement of the mixture and flow of the solvent between each compartment and the next adjacent compartments during only a part of each complete revolution of each compartment. The apparatus of the invention is particularly adapted for carrying out this method, and in its preferred form comprises an elongated hollow cylinder mounted for rotation about its substantially horizontally positioned longitudinal axis and having a series of annular segments circumferentially secured to the interior thereof in spaced and substantially parallel relation with one another and dividing the interior of the cylinder into a plurality of circumferential compartments. The segments are so positioned that the annular segmental space between the ends of any segment is angularly offset with respect to the annular segmental spaces between the ends of adjacent segments. Preferably, this angular displacement of the annular segmental spaces is generally along a spiral concentric to the longitudinal axis of the cylinder. The ends of each segment are connected respectively to the oppositely-positioned ends of the two adjacent segments by deflecting strips of slightly less depth than the depth of the segments.

The foregoing and other novel features of the invention will be best understood from the following description taken in conjunction with the accompanying drawings, in which Fig. 1 is a longitudinal elevation of an apparatus embodying the invention, Fig. 2 is a diagrammatic longitudinal sectional elevation of the apparatus of Fig. 1, Figs. 3, 4 and 5 are diagrammatic sectional views on the section lines 3—3, 4—4 and 5—5, respectively, of Fig. 2, Figs. 6 and 7 are diagrammatic sectional views showing two deflecting strip arrangements, Fig. 8 is a diagrammatic sectional view of the conical frustrum solids discharge of Fig. 2, Figs. 9 and 10 are diagrammatic sectional elevations of modified types of solids discharge, and Fig. 11 is a longitudinal elevation of the combination with the apparatus of Fig. 1 of a drying chamber.

The apparatus illustrated in the drawings comprises a hollow cylinder 15, several times longer than its diameter. The cylinder is positioned with its longitudinal axis substantially horizontal. It is mounted for rotation on tire and trunnion supports 16 by means of a gear and pinion drive 17.

The cylinder 15 is interiorly divided into a number of circumferential compartments (e. g., A, B, C) by a series of annular segments 18 secured to the interior of the cylinder concentric and perpendicular with its longitudinal axis, in spaced and substantially parallel relation with one another. The series of segments 18 constitute in effect spaced annular partitions, each circumferentially incomplete, extending radially inwardly from the interior surface of the cylinder towards but short of the longitudinal axis of the cylinder. The segments 18 are so positioned that the annular segmental space between the ends of any segment is angularly offset with respect to the annular segmental spaces between the ends of the adjacent segments.

The width or depth of the segments 18 may be greatly varied. For example, a depth of from about ¼ to ½ of the radius of the cylinder is typical for many applications of the invention. The space between the segments may also be varied over a wide range, but may conveniently be considered as about equal to the depth of the segments.

The annular segmental space between the ends of each segment, that is the circumferentially incomplete portion thereof, may conveniently be roughly 30° in length, and usually extends the entire depth of the segment, although this is not essential. As previously stated, these spaces are preferably not in line with each other along the cylinder axis, but are angularly offset from each other, preferably so as to be located at points of an imaginary spiral in the cylinder.

The ends of each annular segment are connected respectively to the oppositely-positioned ends of the two adjacent segments by deflecting or transfer strips 19 of slightly less depth than the depth of the segments. Thus, one end of a deflecting strip 19 is connected at the rear edge (that is trailing as the cylinder rotates) of the segmental space in the annular segment between a compartment (B, Fig. 2) containing solid material and the compartment (C) to which such solid materal is next to be delivered. The other end of this deflecting strip is connected at the front edge (that is leading as the cylinder rotates) of the segmental space in the annular segment between the compartment (B) containing the solid material and the compartment (A) from which such solid material was delivered thereto. The deflecting strips move solid material progressively from one compartment to the next adjacent compartment as rotation of the cylinder brings the deflecting strips into contact with such solid material. The deflecting strips may be of uniform depth throughout their length (Fig. 6), or of varying depth (Fig. 7) to more effectively fulfill their purpose. As shown in Fig. 7, the upper part of that end of the segment connected to the shorter end of the strip may be curved (20) to insure the desired flow of liquid from compartment to compartment, as more fully explained hereinafter.

The mixture of soluble and insoluble materials is fed into one end of the cylinder (left end in Figs. 1 and 2—solids feed end and solution discharge end) and the liquid solvent for the soluble material is fed into the other end of the cylinder (residue discharge end and solvent feed end). The segmental spaces between the ends of the segments permit interchange of liquid solvent and solid material between adjacent compartments. This interchange takes place during only a part of each complete revolution of each compartment, that is while the segmental space approaches and moves from its lowermost position. Due to the angular displacement of the segmental spaces, the interchange of liquid and solid between adjacent compartments occurs progressively with respect to the series of compartments.

The deflecting strips are arranged to move the solid material from the solids feed end of the cylinder to the residue discharge end, that is from left to right in Figs. 1 and 2. The liquid moves by gravity from near the residue discharge end of the cylinder towards the other end (right to left, Figs. 1 and 2), leaching out the soluble material as it progresses from compartment to compartment. The depth of liquid in each compartment is usually maintained slightly below the level (depth) of the annular segments. A convenient manner of maintaining the liquid level is to provide a continuous annular ring 21, of less depth than the annular segments 18, at the solution discharge end of the cylinder. The depth of solids in each compartment may be conveniently about half the depth of liquid therein.

The countercurrent movement of the liquid solvent and solid material will be best understood by considering the actions taking place in three adjacent compartments (A, B and C, Fig. 2) as the cylinder slowly rotates in the direction of the arrow. Assume that a charge of solid material has just been received in compartment B from compartment A, and that the segmental space of the annular segment between compartments A and B has just risen above the liquid level. The liquid and solvent are now confined in compartment B and isolated from the other materials in the cylinder by the annular segments which rise above the liquid level. Rotation of the cylinder tumbles the solid material over and at the same time agitates the liquid. The liquid dissolves out some of the soluble material, thus becoming more concentrated. This action continues for about 300° of rotation. The segmental space between the compartments A and B then enters the liquid level. Liquid immediately starts flowing out of compartment B into compartment A, and shortly thereafter liquid begins to flow from compartment C into compartment B. The amount of overlapping of these liquid flows depends on the angular displacement of the segmental spaces. As rotation continues, compartment B begins to receive (on one side of the deflecting strip secured to the annular segments forming the compartment B) solid material from compartment A and then to deliver solid material (from the other side of this deflecting strip) to compartment C. As the segmental spaces (of the annular segments forming compartment B) rise above the liquid level, the flow of liquid ceases. The transfer of solids ceases shortly afterwards and the cycle is repeated.

The separation of the liquid and solid material in each compartment depends on the settling of the solid material in the liquid, which in turn is dependent on the particle size of the solid material and the difference in gravity of the solid material and the liquid in contact therewith. Too much mixing of the liquid and solid material just previous to transfer may cause poor separation, and hence poor leaching action. Agitation is desirable to promote dissolving of the soluble material, and, when settling is rapid enough to permit it, it is advantageous to provide spaced transverse baffles or agitating strips 18' (Fig. 4) in each compartment through the first part (say, half or so) of the cycle following the delivery of solid material thereto. It is also desirable that the segmental spaces and deflecting strips be so formed as to transfer the liquid and solids from compartment to compartment with as little disturbance as possible. Also, the flow of liquid should be so controlled by the size, shape and angular displacement of the segmental spaces and, if necessary, by guide strips, that a minimum of liquid is moved more than one compartment in each revolution of the cylinder.

It is desirable in most cases that the solution discharged from the rotating cylinder be as free as possible of suspended solids. To this end, agitation of the solid material and liquid should be minimized at the solution discharge end of the cylinder. This may be accomplished by delivering the feed of solid material to the cylinder a short distance inwardly from the end thereof, so that the final solution discharge compartment will be subjected to a minimum of disturbance. The mixture of soluble and insoluble solid material may be fed to the rotating cylinder by a spiral conveyor 22. The final solution discharge compartment may be made a more efficient settling chamber by increasing its dimension along the longitudinal axis of the cylinder, and providing the compartment with an inwardly projecting spiral ribbon or strip 23 of just sufficient depth to move settled solid material into the adjacent agitation compartment. The solution discharged from the cylinder may be collected in an appropriate tank 24, from which it is withdrawn by a pump 25. The solution may be further clarified, if desired, by sedimentation, filtering, etc. The solid material resulting from such subsequent clarifying operations may frequently be advantageously worked back into the rotating cylinder.

The liquid solvent is introduced at a suitable temperature into the residue discharge end of the cylinder in any appropriate manner, as for example, by permitting it to run out of a pipe, preferably under volume control. As hereinbefore described, the liquid works its way through the cylinder to the solution discharge end by gravity. A slight amount of frictional resistance must be overcome, which means that the liquid must be at a slightly higher level at the residue discharge end than at the solution discharge end. This may be conveniently accomplished by positioning the cylinder with its longitudinal axis horizontal and permitting the liquid to build up progressively higher on the annular segments nearer the residue discharge end, or by slightly inclining the cylinder so that the liquid flows therethrough at such a rate that the depth of liquid on the annular segments is substantially the same throughout the cylinder.

The residual or extracted solids must be removed from the cylinder in such a manner as not to unduly disturb the liquid level throughout the cylinder. This may be effected in various ways, the choice depending somewhat on the nature of the materials and the desired ratio of solids to liquid in the solids discharge. Where a low solids content is permissible, a pump 26 (Fig. 9) may advantageously be used to remove both the solids and associated liquid from the final compartment at the residue discharge end of the cylinder, care being taken to agitate the mixture of solids and liquid. A scoop discharge may also be used, scoops or buckets 27 (Fig. 10) being provided on the inside of the final compartment to pick up a mixture of solids and liquid and deliver it to a chute 28 for conveying the mixture out of the end of the cylinder.

Where as dry a solids discharge as possible is desired, for example, when the residual solid material is to be subsequently dried, the conical frustrum discharge 29 illustrated in Figs. 1, 2, 8 and 11 may be advantageously employed. This discharge device comprises a hollow conical frustrum, the diameter of its base being approximately the same as the inside diameter of the cylinder and the diameter of its smaller frustrated end being less than twice the distance from the longitudinal center axis of the cylinder to the liquid level therein. The conical frustrum is preferably constructed of a large number of narrow plates 30 extending from the base to the frustrated end in straight lines. These plates overlap each other on their longitudinal edges so as to permit escape of liquid through the spaces between the overlapping edges (Fig. 8). The conical frustrum is positioned in the residue discharge end of the cylinder with its frustrated end facing outwardly and approximately in the plane of the end of the cylinder (or the extractor portion of the cylinder in Fig. 11). The overlapping of the plates is such that as the cylinder and frustrum rotate the spaces between the plates are under the plates on the rising side, simulating in effect a shingled roof. If a very wet mixture of solids and liquid is placed within the rotating conical frustrum above the liquid level in the cylinder, the solids tend to move up on the rising side of the frustrum and any free liquid tends to remain near the lower part of the frustrum and escapes sideways through the spaces between the overlapping plates.

Solid material delivered to the base of the conical frustrum from the adjacent agitating compartment of the cylinder is moved up the conical surface and outwardly by one or more spiral ribbons or strips 31 secured on top of the plates 30 inside the frustrum. The pitch of the spiral ribbon 31 is such that as the cylinder rotates solids are moved up the conical surface and discharged.

The conical frustrum may be of any desired length, but if too short difficulty is encountered in moving solids up the conical surface and the draining time is shortened. A hollow cylinder, constructed of overlapping plates similar to the conical frustrum, may be attached to the smaller end of the frustrum for further draining of solids if desired. The liquid escaping through the overlapping plates of this latter cylinder should fall into or be directed to the main cylinder, as in the case of the conical frustrum. Instead of making the conical frustrum of overlapping plates, the spiral ribbon 31 may be constructed of overlapping sections with sufficient space between the overlapping portions to permit the escape of liquid. If desired, both the conical frustrum and the spiral ribbon may be made of overlapping members.

Some fine solids will usually be carried under the overlapping plates of the conical frustrum by the escaping liquid. Such fine solids will tend to settle in the lower part of the cylinder under the conical frustrum, and may be moved back to the agitating compartment adjacent the base of the conical frustrum, through appropriate openings therein, by one or more spiral ribbons 32 secured to the inner surface of the cylinder between the cylinder and the conical frustrum. If desired, the fine solids collecting between the cylinder and the conical frustrum may be removed by tapping holes in the cylinder wall and drawing off controlled amounts of the solids and liquid.

If desired, the contents of the rotating cylinder may be heated or maintained heated during extraction in any appropriate manner. For example, the liquid solvent and solid material may each be preheated and delivered hot to the cylinder, or the cylinder may be either externally or internally heated. Where hot waste gases are available, which are not deleterious to the cylinder contents, they may be passed through the cylinder. In addition to heating the contents of the cylinder, such hot waste gases are scrubbed in the course of their passage through the cylinder, thereby removing solids and soluble materials therefrom, which in some cases is of advantage. If desired, the cylinder may be insulated to better retain its heat.

When the solid residual product discharged from the cylinder is to be dried, it is of advantage to embody the extractor and dryer in a unitary cylindrical structure. This modification of the invention is illustrated in Fig. 11 of the drawings. In this construction the conical frustrum is positioned intermediate the ends of the cylinder 15'. The wet solids discharged from the extractor portion of the cylinder by the conical frustrum 29 are delivered into the extended portion of the cylinder and are moved towards the end of the cylinder by a spiral ribbon 33 secured to the interior surface of the dryer portion of the cylinder. The dry solids fall into a bin 34 from which they are removed in any suitable manner. Hot waste gases are delivered to the dry solids discharge end of the rotating cylinder through a sealed hood 35 and are drawn through the cylinder by a fan 36 operatively associated with a sealed hood 37 at the opposite end of the cylinder.

The apparatus of Fig. 11 is particularly adapted for leaching soluble alkali chromates from the calcined product resulting from kiln roasting chromite ore and soda ash. The calcined product (after screening or grinding or both as desired) is delivered, preferably while still warm, to the solids feed end of the cylinder 15', and hot waste gases from the kiln are conducted into the other end of the cylinder. The calcined product is leached in the extractor portion of the cylinder, as hereinbefore described, and the extracted wet residue is delivered to the dryer portion of the cylinder. Here the residue meets the hot gases from the kiln, and these gases after drying the residue pass into the extractor portion of the cylinder and impart heat to the contents thereof. Dust carried by the hot kiln gases is largely removed by the wet surfaces in the extractor portion of the cylinder. Thus, waste heat from the kiln is utilized to dry the extracted residue and to keep the extractor warm.

The apparatus hereinbefore described may be constructed of any material of sufficient strength and corrosion resistance. Ordinarily, sheet iron is satisfactory for the purpose. The size and dimensions of the rotating cylinder will be determined in practice by the nature of the mixture of soluble and insoluble materials, the soluble material and the liquid solvent therefor. The principal factors to be considered are the volume of soluble material to be extracted in a given time, the volume of liquid solvent to be used for extracting that amount of soluble material, and the time required to make such an extraction under the conditions of agitation and liquid concentrations characteristic of the apparatus. Knowing the number of cubic feet of solids to be handled per hour and the extracting time in hours, the volume of solids in the extractor is obtained by multiplying these two figures. This volume of solids may be treated in a short cylinder of large diameter or a long cylinder of small diameter. The depth to which the cylinder should be filled by the solid material may be greatly varied, but a quarter of the radius of the cylinder is typical. The cylinder proportions are determined on the basis of agitation produced, cost, space available and similar factors. After determining the cylinder proportions, the depth of the deflecting strips 19 is determined by the depth of solid material in the cylinder.

The liquid solvent delivered to the cylinder must be equal in volume to the liquid discharged from both ends of the cylinder, and to this end accurate control of the amount of liquid containing soluble material which is discharged at or near the residue discharge end of the cylinder is desirable and in some instances necessary. While the amount of solution discharged by the apparatus, at the solution discharge end, is limited, nothing fixes the amount of liquid within the apparatus and this may be widely varied. However, a liquid depth approximately twice the depth of solid material is ordinarily satisfactory. When the depth of liquid to be maintained in the cylinder has been determined, the depth of the annular segments 18 is determined so as to be greater than the liquid depth.

Increasing the number of compartments theoretically increases the efficiency of the apparatus, but the advantage becomes less as the number of compartments is increased. There is little practical advantage in extracting efficiency in increasing the compartments over about 30–40. The extracting length of the cylinder divided by the number of compartments gives the axial length of each compartment. If this axial length is substantially less than the depth of the annular segments 18, better results will ordinarily be obtained by lengthening the cylinder and reducing its diameter.

The number of revolutions per minute of the cylinder is determined by dividing the extracting time in minutes by the number of compartments. The cylinder need not necessarily be of the same diameter throughout. This applies particularly to the two portions of the cylinder used respectively for extracting and drying (Fig. 11).

The annular segments 18 may, if desired be circular disks with suitable openings cut therein corresponding to the aforementioned annular segmental spaces to permit the contemplated countercurrent movement of liquid and solids. However, with such an arrangement the interior of the cylinder is inaccessible and the arrangement offers little if any compensating advantage. Two or more deflecting strips 19 may, if desired, be used in each compartment, thereby dividing the compartment into two or more compartments and moving the solid material two or more times as fast per revolution.

While the mixture of soluble and insoluble material fed into the cylinder (e. g. by screw conveyor 22) has hereinbefore been generally described as dry, it need not be so. The soluble material may, for example, be a liquid or a solid dissolved in a small amount of liquid.

I claim:

1. The improvement in continuously extracting soluble material from a mixture of soluble and insoluble materials which comprises countercurrently passing a liquid solvent for the soluble material and a mixture of the soluble and insoluble materials through an operatively connected series of rotating compartments in each of which agitation of the solvent and materials is effected in consequence of the rotation, and effecting the countercurrent movement of the mixture and solvent between one compartment and the next adjacent compartments during only a small part of each complete revolution of each compartment while a relatively small amount of mixture and solvent is confined in other compartments of the series, at which time the said other compartments are disconnected for the exchange of the mixture or solvent.

2. In the improvement according to claim 1, delivering the residual material from the final extracting compartment in said series to a rotating conical surface pervious to liquid along which the residual material is caused to move upwardly and to drain prior to its discharge as extracted material.

3. The improvement in continuously extracting soluble material from a mixture of soluble and insoluble materials which comprises countercurrently passing a liquid solvent for the soluble material and a mixture of the soluble and insoluble materials through an operatively connected series of rotating compartments, effecting the countercurrent movement of the mixture and solvent between one compartment and the next adjacent compartments by progressively establishing communication for the passage of the mixture and solvent between said one compartment and its adjacent compartments during only a relatively small part of each revolution thereof, and during such period of communication the other compartments of the series are disconnected for the passage of mixture or solvent and contain a relatively small amount of mixture and solvent which is confined for the major part of each reovlution, whereby the solvent is agitated with all the mixture in a series of separate extractions and short-circuiting of portions of the mixture is substantially prevented.

4. In the improvement according to claim 3, delivering the residual material from the final extracting compartment in said series to a rotating conical surface pervious to liquid along which the residual material is caused to move upwardly and to drain prior to its discharge as extracted material.

5. An apparatus for extracting soluble material from a mixture of soluble and insoluble materials, comprising a rotatably mounted hollow cylinder positioned with its longitudinal axis substantially horizontal, a series of spaced and radially-positioned partitions dividing the interior of the cylinder into a plurality of compartments, each of said partitions being circumferentially incomplete with the circumferentially incomplete portions of the partitions angularly staggered with respect to one another, and transfer strips of substantially less depth than the radius of said cylinder connecting the edges of the circumferentially incomplete portion of each partition to the opposite edges respectively of the circumferentially incomplete portions of the two adjacent partitions.

6. An apparatus for extracting soluble material from a mixture of soluble and insoluble materials, comprising a rotatably mounted hollow cylinder positioned with its longitudinal axis substantially horizontal, a series of spaced annular partitions extending radially inwardly from the interior surface of the cylinder towards but not reaching the longitudinal axis of the cylinder, each of said partitions being circumferentially incomplete with the circumferentially incomplete portions of the partitions angularly staggered with respect to one another, and deflecting strips of slightly less width than the radial depth of said partitions connecting one end of each partition to the oppositely-positioned end of the next adjacent partition.

7. An apparatus for extracting soluble material from a mixture of soluble and insoluble materials, comprising a rotatably mounted hollow cylinder positioned with its longitudinal axis substantially horizontal, means for feeding a mixture of soluble and insoluble materials and a liquid solvent for the soluble material into opposite ends respectively of the cylinder, a series of spaced annular partitions extending radially inwardly from the interior surface of the cylinder towards but not reaching the longitudinal axis of the cylinder, each of said partitions being circumferentially incomplete with the circumferentially incomplete portions of the partitions angularly staggered with respect to one another, deflecting strips of slightly less width than the radial depth of said partitions connecting one end of each partition to the oppositely-positioned end of the next adjacent partition, and means for removing from the cylinder the insoluble material and the liquid solution of the soluble material.

8. An apparatus for extracting soluble material from a mixture of soluble and insoluble materials, comprising a rotatably mounted hollow cylinder positioned with its longitudinal axis substantially horizontal, the interior of said cylinder being divided into a series of operatively communicating compartments through which rotation of the cylinder causes countercurrent movement of said materials and a liquid solvent for the soluble material, a hollow conical frustrum concentrically mounted within one end of said cylinder and operatively communicating at its base with a compartment near that end of the cylinder, and baffle means operatively connected to said frustrum for causing rotation of said cylinder to move insoluble material towards the smaller end of said frustrum.

9. In an apparatus for extracting soluble material from a mixture of soluble and insoluble materials in which said materials and a liquid solvent for the soluble material move countercurrently through a rotatably mounted hollow cylinder positioned with its longitudinal axis substantially horizontal, a hollow conical frustrum secured within the residue discharge end of said cylinder with its frustrated end outward and its base adapted to receive residue to be discharged from the cylinder, and means operatively connected to and projecting into the hollow portion of said frustrum for moving the residue received at its base towards the frustrated end thereof as the cylinder rotates.

10. An apparatus according to claim 9 in which the wall of the hollow conical frustrum is pervious to liquid.

11. An apparatus according to claim 9 in which the wall of the hollow conical frustrum is made of overlapping plates to permit escape of liquid therethrough.

12. An apparatus for extracting soluble material from a mixture of soluble and insoluble materials, comprising a rotatably mounted hollow cylinder positioned with its longitudinal axis substantially horizontal, a series of spaced annular partitions extending radially inwardly from the interior surface of the cylinder towards but not reaching the longitudinal axis of the cylinder, each of said partitions being circumferentially incomplete with the circumferentially incomplete portions of the partitions angularly staggered with respect to one another, deflecting strips of slightly less width than the radial depth of said partitions connecting one end of each partition to the oppositely-positioned end of the next adjacent partition, and means for removing insoluble material from the cylinder including a hollow conical frustrum concentrically positioned within one end of the cylinder and having a spiral deflecting strip associated with the interior surface thereof for moving insoluble material towards the smaller end of the frustrum as the cylinder rotates.

13. An apparatus according to claim 12 in which the wall of the hollow conical frustrum is pervious to liquid.

14. An apparatus according to claim 12 in which the wall of the hollow conical frustrum is made of overlapping plates to permit escape of liquid therethrough.

15. An apparatus for extracting soluble material from a mixture of soluble and insoluble materials, comprising an elongated hollow cylinder mounted for rotation about its substantially horizontally-positioned longitudinal axis, a series of spaced annular partitions extending radially inwardly from the interior surface of the cylinder towards but not reaching the longitudinal axis of the cylinder, each of said partitions being circumferentially incomplete with the circumferentially incomplete portions of the partitions positioned generally along a spiral concentric to the longitudinal axis of the cylinder, and means operatively associated with adjacent partitions for causing solid material and liquid to move countercurrently through the cylinder progressively in separate step by step movements when the cylinder is rotated.

16. An apparatus for extracting soluble material from a mixture of soluble and insoluble materials, comprising an elongated hollow cylinder mounted for rotation about its substantially horizontally-positioned longitudinal axis, said cylinder having a substantial portion but not all of its longitudinal length provided with a series of spaced annular partitions extending radially inwardly from the interior surface of the cylinder towards but not reaching the longitudinal axis of the cylinder, each of said partitions being circumferentially incomplete with the circumferentially incomplete portions of the partitions angularly staggered with respect to one another, means operatively associated with adjacent partitions for causing solid material and liquid to move countercurrently through the cylinder when the cylinder is rotated, and a hollow conical frustrum concentrically positioned within and intermediate the ends of the cylinder and having a spiral deflecting strip associated with the interior surface thereof for moving insoluble material from that portion of the cylinder provided with said spaced partitions towards the smaller end of the frustrum and into the other portion of the cylinder.

17. An apparatus for extracting soluble material from a mixture of soluble and insoluble materials, comprising an elongated hollow cylinder mounted for rotation about its substantially horizontally-positioned longitudinal axis, said cylinder having a substantial portion but not all of its longitudinal length provided with a series of spaced annular partitions extending radially inwardly from the interior surface of the cylinder towards but not reaching the longitudinal axis of the cylinder, each of said partitions being circumferentially incomplete with the circumferentially incomplete portions of the partitions angularly staggered with respect to one another, means operatively associated with adjacent partitions for causing solid material and liquid to move countercurrently through the cylinder when the cylinder is rotated, a hollow conical frustrum concentrically positioned within and intermediate the ends of the cylinder and having a spiral deflecting strip associated with the interior surface thereof for moving insoluble material from that portion of the cylinder provided with said spaced partitions towards the smaller end of the frustrum and into the remaining portion of the cylinder, means for feeding a mixture of soluble and insoluble materials into and means for withdrawing the liquid solution of the soluble material from that end of the cylinder provided with said spaced partitions, means for introducing a liquid solvent for the soluble material into the cylinder approximate the larger end of said frustrum, and means for causing the rotation of said cylinder to move insoluble solid material through said remaining portion of the cylinder to a solids discharge end.

18. An apparatus according to claim 17, having means for introducing a stream of hot gas into said solids discharge end of the cylinder and for withdrawing the gas from the opposite end of the cylinder.

ALFRED E. VAN WIRT.